(12) United States Patent
Pachler et al.

(10) Patent No.: US 9,412,062 B2
(45) Date of Patent: Aug. 9, 2016

(54) RFID APPARATUS, RFID READER, PORTION HOT-DRINKS MACHINE AND SYSTEM

(71) Applicant: INFINEON TECHNOLOGIES AG, Neubiberg (DE)

(72) Inventors: Walther Pachler, Graz (AT); Gerald Holweg, Graz (AT); Guenter Hofer, St. Oswald (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/468,362

(22) Filed: Aug. 26, 2014

(65) Prior Publication Data

US 2015/0053764 A1 Feb. 26, 2015

(30) Foreign Application Priority Data

Aug. 26, 2013 (DE) .......................... 10 2013 109 212

(51) Int. Cl.
| | |
|---|---|
| *G06K 7/00* | (2006.01) |
| *G06K 19/077* | (2006.01) |
| *A47J 31/44* | (2006.01) |
| *G06K 7/08* | (2006.01) |
| *G06K 19/07* | (2006.01) |

(52) U.S. Cl.
CPC ....... *G06K 19/07756* (2013.01); *A47J 31/4492* (2013.01); *G06K 7/08* (2013.01); *G06K 19/0723* (2013.01)

(58) Field of Classification Search
CPC ................... G06K 19/0723; G06K 19/07756; G06K 7/08
USPC .......................................... 235/439, 449, 492
See application file for complete search history.

(56) References Cited

U.S. PATENT DOCUMENTS

| | | | | |
|---|---|---|---|---|
| 7,617,850 | B1 * | 11/2009 | Dorney | ........................... 141/94 |
| 8,151,832 | B1 * | 4/2012 | Dorney | ............. A47G 19/2227 141/360 |
| 8,405,502 | B2 * | 3/2013 | Teague | ..................... 340/539.12 |
| 8,646,695 | B2 * | 2/2014 | Worrall et al. | ................ 235/488 |
| 8,851,387 | B2 * | 10/2014 | Kuo | ................ G06K 19/07771 235/492 |
| 2008/0150693 | A1 * | 6/2008 | You et al. | ..................... 340/10.1 |
| 2008/0156886 | A1 * | 7/2008 | Tsuchiya | ...................... 235/492 |

FOREIGN PATENT DOCUMENTS

DE 102004003309 A1 8/2005

* cited by examiner

*Primary Examiner* — Seung Lee
(74) *Attorney, Agent, or Firm* — Viering, Jentschura & Partner mbB

(57) ABSTRACT

In various embodiments, a Radio Frequency Identification apparatus includes a coupling body having a metal material and a transponder chip configured to contactlessly transmit data. The transponder chip is physically coupled to the coupling body, has a storage element which stores the data, and has a first electrode which is at a distance from the coupling body. The coupling body is in the form of a second electrode for the transponder chip configured to couple the transponder chip to an external Radio Frequency Identification reader for reading the data.

11 Claims, 5 Drawing Sheets

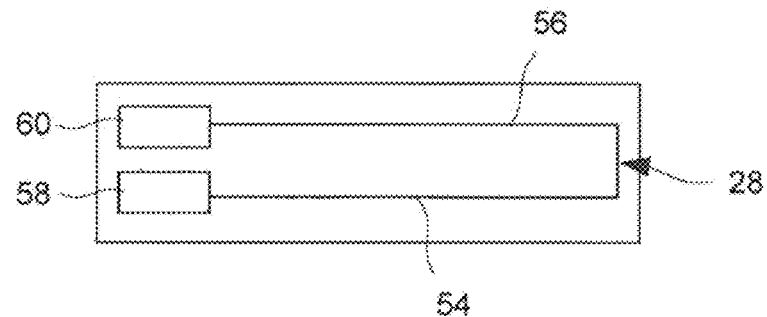
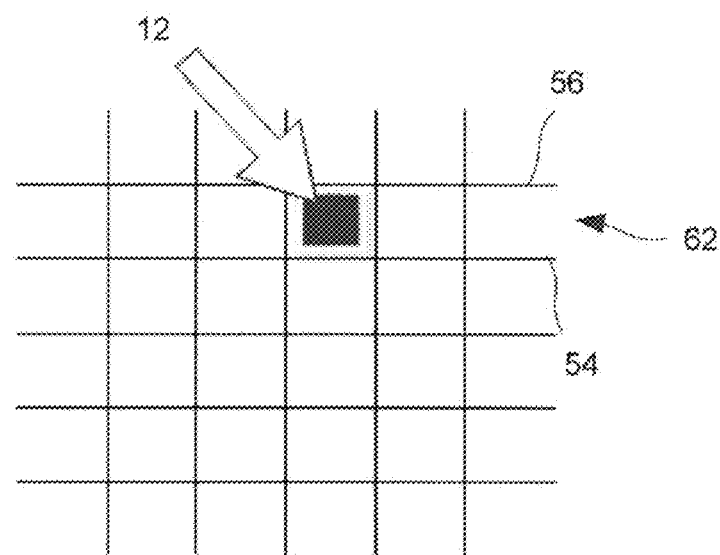
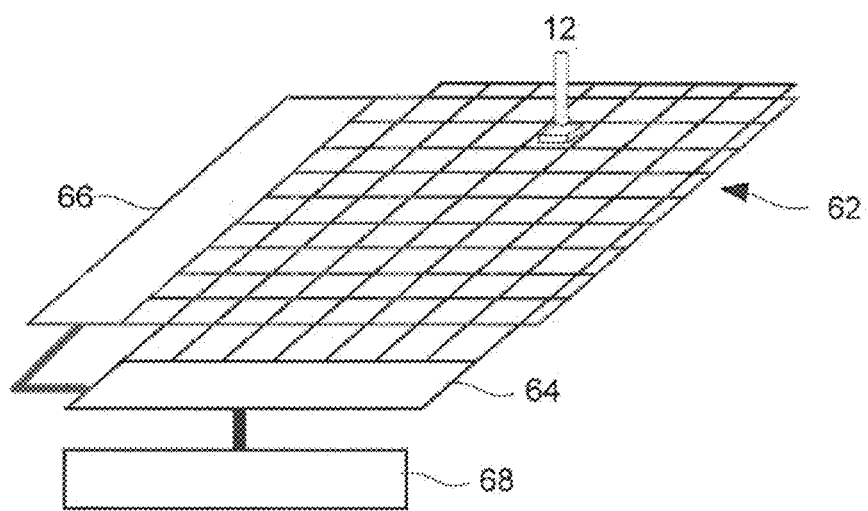

RFID APPARATUS, RFID READER, PORTION HOT-DRINKS MACHINE AND SYSTEM

CROSS-REFERENCE TO RELATED APPLICATION

This application claims priority to German Patent Application Serial No. 10 2013 109 212.8, which was filed Aug. 26, 2013, and is incorporated herein by reference in its entirety.

TECHNICAL FIELD

Various embodiments relate generally to an RFID apparatus, an RFID reader, a portion hot-drinks machine and a system.

BACKGROUND

In a conventional RFID (radio frequency identification) transponder chip, a coil having a plurality of windings is usually used as an antenna for communicating with an RFID reader. The antenna is directly arranged on the RFID transponder chip (on-chip coil) or on a body coupled to the RFID transponder chip. The on-chip coils usually have a plurality of layers which are connected by means of lines (vias). As a result, at least geometrical boundary conditions to be complied with can be predefined for the logic of the chip, thus resulting in design and/or technical restrictions. On account of the use of inductive coils for communication, communication is dependent on resonances. Coupling and therefore communication are often possible only in the high-frequency range (HF) or in the ultra-high-frequency range (UHF).

In the case of an inductive, frequently inhomogeneous, magnetic field for communication, as in an RFID transponder chip with a coil as an antenna, clear separation of a coupling area, in which the antenna is formed, from an electronic area, in which the logical components of the transponder chip are arranged, is possible only with difficulty, which may influence communication. In addition, an on-chip coil causes self-heating of the corresponding transponder chip. Not only eddy currents, caused by the magnetic field, but also the high induced currents in the coil may result in the transponder chip being heated to a relatively severe extent. In addition, RFID technology is poorly suited to identifying objects, for example capsules, jewelry or coins, which have a lot of metal or are formed largely from metal since the metal has an adverse effect on RFID performance.

In order to be able to couple sufficient energy into RFID transponders having very small antennas, for example integrated antennas on or in the transponder chip, a very concentrated field is often applied to the RFID transponder. Therefore, the RFID transponder chip and the antenna of the RFID reader are often positioned exactly with respect to one another. This is only possible if the exact position of the RFID transponder chip is known and the antenna can actually be positioned exactly with respect to the position of the RFID transponder. Large antennas in the form of large loops, as are conventional in other RFID systems, often cannot be used since they do not enable a sufficient field concentration. Although antennas having small loops can enable the required field concentration, they have the great disadvantage that the position of the RFID transponder chip must be known exactly in order to then bring the small loops of the antennas very close to this position. However, often either the position is not known and/or exact positioning of the antenna of the reader is not possible or acceptable.

SUMMARY

In various embodiments, a Radio Frequency Identification apparatus includes a coupling body having a metal material and a transponder chip configured to contactlessly transmit data. The transponder chip is physically coupled to the coupling body, has a storage element which stores the data, and has a first electrode which is at a distance from the coupling body. The coupling body is in the form of a second electrode for the transponder chip configured to couple the transponder chip to an external Radio Frequency Identification reader for reading the data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows an embodiment of an antenna of an RFID reader;

FIG. 9 shows a plan view of an embodiment of an area detection field of an RFID reader;

FIG. 10 shows a perspective view of the area detection field according to different embodiments;

DESCRIPTION

Figure 1:
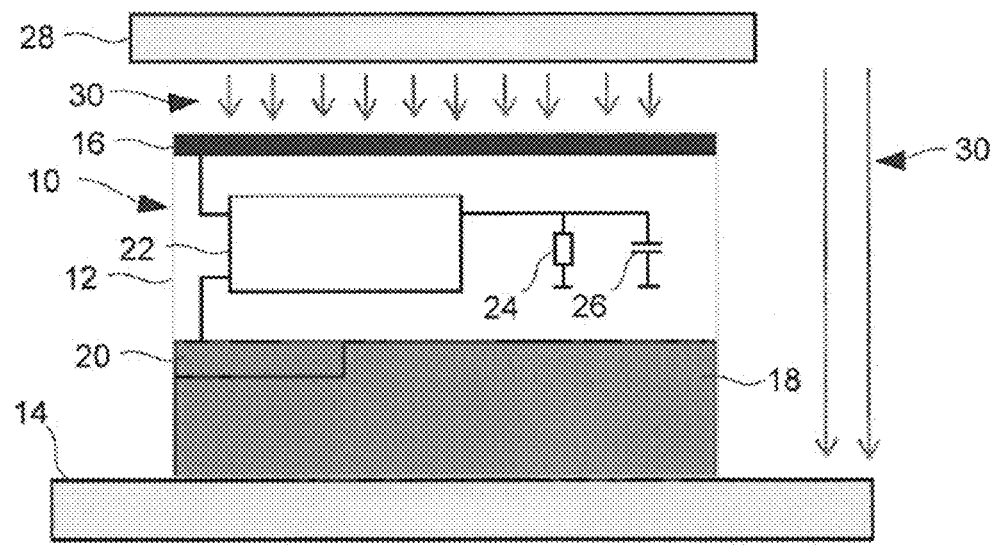
FIG. 1 shows an embodiment of an RFID apparatus.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the following detailed description, reference is made to the accompanying drawings which form part of this description and show, for the purpose of illustration, specific embodiments in which the invention can be carried out. In this respect, direction terminology, for instance "at the top", "at the bottom", "at the front", "at the rear", "front", "rear", etc., is used with respect to the orientation of the described figure (s). Since components of embodiments can be positioned in a number of different orientations, the direction terminology is used for illustration and is not restrictive in any way. It goes without saying that other embodiments can be used and structural or logical changes can be made without deviating from the scope of protection of the present invention. It goes without saying that the features of the different embodiments described herein can be combined with one another unless specifically indicated otherwise. Therefore, the following detailed description should not be interpreted in a restrictive sense, and the scope of protection of the present invention is defined by the attached claims.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Within the scope of this description, the terms "linked", "connected" and "coupled" are used to describe both a direct and an indirect link, a direct or indirect connection and direct or indirect coupling. In the figures, identical or similar elements are provided with identical reference symbols if expedient.

Various embodiments provide an RFID apparatus which can be produced in a simple and cost-effective manner and/or makes it possible to precisely communicate with a transponder chip of the apparatus in a simple manner.

Various embodiments provide an RFID reader which can be produced in a simple and cost-effective manner and/or makes it possible to precisely communicate with a transponder chip of an RFID apparatus in a simple manner.

Various embodiments provide a portion hot-drinks machine which makes it possible to read data on a transponder chip, which is arranged on a drinks capsule, in a simple manner.

Various embodiments provide a system which makes it possible to read data on a transponder chip of an RFID apparatus in a simple manner using an RFID reader.

Various embodiments provide an apparatus. The apparatus has a coupling body having a metal material, and a transponder chip for contactlessly transmitting data. The transponder chip is physically coupled to the coupling body and has a storage element which stores the data. The transponder chip also has a first electrode which is at a distance from the coupling body. The coupling body is in the form of a second electrode for the transponder chip for coupling the transponder chip, e.g. in a capacitive manner, to an external reader for reading the data.

As a result of the use of the exemplarily capacitive coupling for communication between the transponder chip and the RFID reading apparatus, the apparatus can be produced in a simple and cost-effective manner and/or enables precise communication between an RFID reader and the transponder chip of the apparatus in a simple manner. The RFID reader has two electrodes and can capacitively read the data on the transponder chip in the vicinity of the apparatus. The coupling body which has the metal material and may interfere with communication in known apparatuses is used as an electrode for e.g. capacitive coupling for communication and may support the latter instead of interfering with communication. This may contribute to precise communication between the RFID reader and the RFID apparatus.

In contrast to the RFID apparatuses with on-chip coils which usually have a plurality of layers, only one layer, e.g. the first electrode, is required on one side of the transponder chip. This produces new geometrical degrees of freedom for the design of the logic circuit of the transponder chip.

The capacitive areas of the RFID apparatus, e.g. the electrodes, are no longer dependent on resonances, in contrast to inductive coils. Coupling for communication is possible both in the high-frequency range and in the ultra-high-frequency range. Furthermore, the capacitive coupling using the electrodes results in self-heating of the transponder chip which is low in comparison with on-chip coils. For example, no such high eddy currents are caused and no such high currents are induced either, with the result that the transponder chip is heated only slightly.

In various embodiments, the first electrode is formed on a first side of the transponder chip, and the coupling body is arranged on a second side of the transponder chip facing away from the first side. For example, the first side of the transponder chip and/or of the RFID apparatus may be formed from the first electrode. This may contribute to producing the RFID apparatus and/or the transponder chip in a simple and/or cost-effective manner. In addition, the first electrode can be used to protect the transponder chip from external electromagnetic radiation.

In various embodiments, the first electrode is flat and extends over the first side of the transponder chip. A gapless first electrode additionally protects the chip logic from interfering external electromagnetic radiation. In contrast to an inductive, usually inhomogeneous, magnetic field of a coil, the metal area here defines clear separation between the coupling area for communication and the electronic circuit, for example a logic circuit, of the transponder chip.

In various embodiments, the transponder chip has a wide-range rectifier. The wide-range rectifier can contribute to ensuring the frequency independence of the logic circuit.

In various embodiments, the wide-range rectifier is arranged between the first electrode and the coupling body.

In various embodiments, the coupling body is formed from metal. The coupling body has aluminum, for example.

In various embodiments, the first electrode has aluminum or copper. The first electrode may be formed from aluminum, for example.

In various embodiments, the transponder chip is fastened to the coupling body by means of a bonding agent. The bonding agent may be an adhesive, a synthetic resin or a solder, for example.

In various embodiments, the coupling body is formed from at least one subelement of a drinks capsule, of a coin, of a banknote or of an item of jewelry. Drinks capsules, coins, subelements of a banknote, for example a security strip, and/or subelements of an item of jewelry are often metal and are therefore suitable as the coupling body. The RFID apparatus may contribute, for example, to making said metal objects forgery-proof.

Alternatively or additionally, the RFID apparatus makes it possible to add important information to the drinks capsules, coins, banknotes or jewelry. If the coupling body is formed from a drinks capsule, the metal of the drinks capsule can be used as a second electrode for communicating with the RFID reader. The transponder chip can be arranged on the metal of the drinks capsule such that capacitive coupling of the RFID reader to the transponder chip in order to transmit the information can be ensured. For example, the origin of the basic material of the hot drink, for example the coffee powder, the coffee syrup or the tea leaves, its expiry date, its date of sale and/or its recommended type of preparation can be displayed on a corresponding portion hot-drinks machine which is intended to be used to brew the hot drink in the drinks capsule. In the case of coins, banknotes or jewelry, the information may have, for example, the value of the corresponding object, its place of manufacture, date of manufacture, materials and/or the manufacturer.

Various embodiments provide an RFID reader for capacitive or inductive coupling for reading data on a transponder chip.

The RFID reader for capacitive coupling has an electronic circuit for reading the data and electrodes. The electrodes are in the form of flat metals which enable capacitive coupling.

The RFID reader for inductive coupling has an electronic circuit for reading the data and an antenna. The antenna has electrically conductive lines which may form a coil, for example.

The antenna of the RFID reader may be very narrow, for example, and may be in different, for example elongate, forms. For example, two parallel lines may be in the form of a conductor loop. The specially shaped antenna loop(s) may ensure a sufficiently high field strength for inductively coupled near-field applications in the RFID sector. For example, a sufficiently strong electromagnetic field can be generated using the specially shaped antenna in order to ensure near-field coupling to a corresponding transponder chip. Furthermore, this method makes it possible to produce a large detection area for RFID apparatuses using a small antenna. Fields of application which require only a very short reading range can be provided with on-chip antennas by combining the specially shaped antenna in the RFID reader and RFID transponders. For example, it is possible to read an RFID apparatus in a paper, for example a banknote, very precisely even if the position of the RFID apparatus varies, for example if the paper or banknote, for example, is moved over the parallel lines of a coil antenna arranged in an elongated manner. It is also possible to read transponder chips on objects which are, for example, symmetrical or asymmetrical, for example on drinks capsules in which the exact position of the transponder chip is not known.

In various embodiments, the antenna turn(s) is/are arranged in a circular manner. For example, the lines of the antenna may be circular and/or may be designed in such a manner that they form a circular opening in which a drinks capsule can be arranged, for example in such a manner that the lines are in direct physical contact with the drinks capsule and/or the transponder chip of the drinks capsule.

In various embodiments, a plurality of elongate antennas are arranged in such a manner that their lines intersect and other elongate antennas are arranged parallel to one another, with the result that the pairs of lines form a matrix. The combination of a plurality of parallel antennas beside one another produces an area detection field on which an RFID apparatus, for example an RFID transponder chip, can be detected. For example, the area detection field makes it possible to determine the position of the RFID transponder chip on the area detection field. The horizontal and/or vertical position of the RFID apparatus can be determined, for example, by multiplexing and/or scanning the lines.

Various embodiments provide a portion hot-drinks machine for receiving a drinks capsule. The portion hot-drinks machine has an RFID reader which is designed and arranged in such a manner that, when a drinks capsule having an RFID transponder chip with data stored thereon is arranged in the portion hot-drinks machine in the intended manner, the data on the RFID transponder chip can be read with the aid of the RFID reader. The RFID reader easily makes it possible to automatically obtain information relating to the coffee in the drinks capsule before or during preparation of the coffee. The fact that the drinks capsule is arranged in the portion hot-drinks machine in the intended manner may mean, for example, that the drinks capsule is in the position and/or location in which the hot drink can be prepared.

In various embodiments, the portion hot-drinks machine has a clamping apparatus for receiving and holding the drinks capsule, for example when preparing the hot drink. The clamping apparatus has a first reading electrode and a second reading electrode which are arranged in such a manner that, when a drinks capsule is arranged in the portion hot-drinks machine in the intended manner, the second reading electrode is arranged adjacent to a metal body of the drinks capsule and the first reading electrode is arranged adjacent to a first electrode of the transponder chip, in which case a second electrode of the transponder chip may be formed from a housing of the drinks capsule, for example. This easily makes it possible to read the data from the transponder chip while the drinks capsule is arranged in the portion hot-drinks machine in the intended manner.

In various embodiments, the first reading electrode is formed from the antenna. In other words, the antenna is used as the first reading electrode.

In various embodiments, the antenna of the RFID reader is circular and is arranged in such a manner that, when a drinks capsule is arranged in the portion hot-drinks machine in the intended manner, the antenna runs at least partially around the circumference of the drinks capsule. This may contribute to being able to read the data in a precise and reliable manner irrespective of a rotational position of the drinks capsule and therefore the position of the transponder chip.

Various embodiments provide a system having the RFID apparatus explained above, the RFID reader explained above and/or the portion hot-drinks machine explained above.

FIG. 1 shows an embodiment of an RFID apparatus 10. The RFID apparatus 10 may have, for example, a transponder chip 12 and a coupling body 14. The coupling body 14 may have, for example, a metal material, for example a metal, a metalloid and/or an alloy, and may be physically coupled to the transponder chip 12. The transponder chip 12 may have a first electrode 16, for example on its first side facing away from the coupling body 14. The first electrode 16 may form a first surface of the transponder chip 12, for example. The first electrode 16 may have, for example, a metal, for example aluminum. The transponder chip 12 may have, for example, a substrate 18 which can be used to physically couple the transponder chip 12 to the coupling body 14.

The transponder chip 12 may have, for example, an electronic circuit which is only partially illustrated in FIG. 1. The electronic circuit of the transponder chip may have, for example, a rectifier circuit, for example a wide-range rectifier 22. The wide-range rectifier 22 may be electrically coupled, for example, to the first electrode 16 and/or to the substrate 18, for example via a substrate contact 20. The electronic circuit may also have a resistor, for example, which is used to electrically connect the wide-range rectifier 22 to a ground connection. The electronic circuit may also have, for example, a capacitor 26 which can be used to connect the wide-range rectifier 22 to a ground connection. Furthermore, the electronic circuit may have, for example, a storage element (not illustrated) which can store data. The data may comprise information, for example. The information may relate to properties of the coupling body 14, for example, and/or may be information connected to the coupling body 14.

In order to read the data, the RFID apparatus 10 may be coupled, for example capacitively, to an RFID reader which is only partially illustrated in FIG. 1. The RFID reader has a first reading electrode 28 and a second reading electrode which is not illustrated in FIG. 1. An electrical field 30 which can be used to read the data can be produced between the first reading electrode 28 and the second reading electrode. In order to read the data, the electrical field 30 may be generated as an alternating field. The wide-range rectifier 22 makes it possible for the data to be read using a high-frequency alternating field (HF) and/or using an ultra-high-frequency alternating field (UHF), in which case a corresponding high-frequency or ultra-high-frequency voltage can be applied to the first and second reading electrodes 28 in order to read the data. The data are then read capacitively.

The coupling body 14 may be, for example, a housing of a drinks capsule, for example a coffee capsule or a tea capsule, a coin, a subelement of a banknote, for example a metal security strip of the banknote, and/or a subelement of an item of jewelry, for example a holder for a precious stone. The data stored on the transponder chip 12 may then relate, for example, to information relating to the coin, the drinks capsule, the tea capsule, the banknote or the item of jewelry. The information may have, for example, a date of manufacture, a place of manufacture, contents and/or material contents and/or information relating to the manufacturer. If the coupling body is part of food packaging, for example the drinks capsule, the information may also relate to an expiry date of the food, for example.

The transponder chip 12 may be arranged on the coupling body 14, for example using a particular method, for example by means of adhesive bonding. In this case, there is no need for a conductive connection between the transponder chip 12 and the coupling body 14. In this case, the capacitive coupling makes it possible to bridge non-conductive distances.

Figure 2:
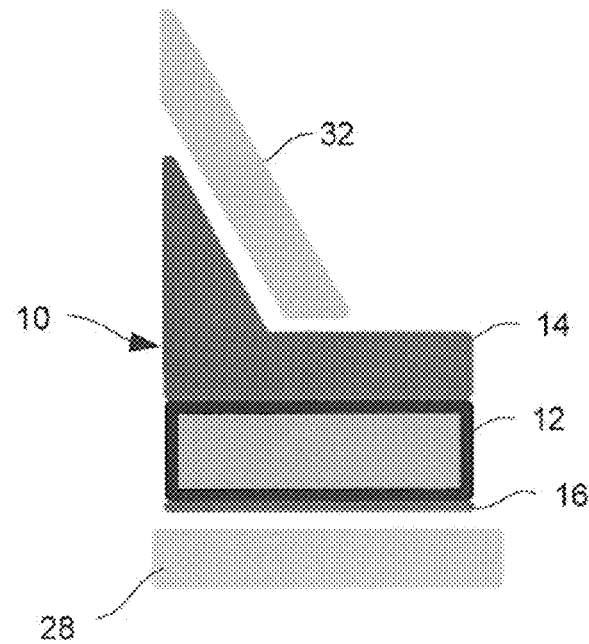
FIG. 2 shows an embodiment of an RFID apparatus.

FIG. 2 shows a detailed view of an embodiment of an RFID apparatus 10, for example the RFID apparatus 10 explained above, which may be in the form of a drinks capsule, for example. For example, the coupling body 14 may be formed from a housing of the drinks capsule in which a basic material of the hot drink is arranged. For example, the coupling body 14 may be formed from a protruding edge of the housing of the drinks capsule, in which case the coupling body can extend over the entire housing of the drinks capsule in the case of an electrically conductive housing.

An RFID reader (not illustrated in FIG. 2) for reading the data on the transponder chip 12 may have the first electrode 28 and a second electrode 32, for example. The first electrode 28 of the RFID reader may be arranged close to the first electrode 16, for example, and the second electrode 32 of the RFID reader may be arranged close to the coupling body 14, for example. The first reading electrode 28 may be in direct physical contact with the first electrode 16, for example, and/or the second reading electrode 32 may be in direct physical contact with the coupling body 14, for example. The data can then be read, for example, in the manner explained above with respect to FIG. 1.

Figure 3:
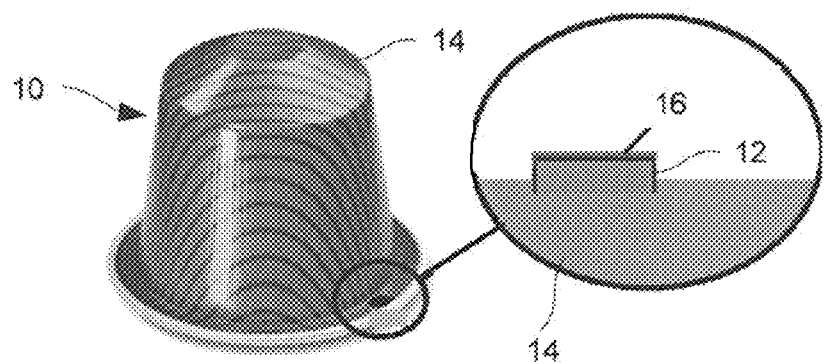
FIG. 3 shows an embodiment of an RFID apparatus.

FIG. 3 shows an embodiment of an RFID apparatus 10, for example the RFID apparatus 10 explained above, and a detailed view of the RFID apparatus 10. The RFID apparatus 10 may be, for example, in the form of a drinks capsule, for example in accordance with the drinks capsule explained above. On its underside shown in FIG. 3, the drinks capsule may have, for example, a widened portion, for example the protruding edge explained above, on which the transponder chip 12 can be arranged. Like in the detailed view of the transponder chip 12 shown in FIG. 3, the transponder chip 12 may be arranged, for example, on a top side (shown in FIG. 3) of the protruding edge of the housing of the drinks capsule, e.g. of the coupling body 14. Alternatively or additionally, as shown in FIG. 2, the transponder chip 12 may be arranged, for example, on an underside of the protruding edge of the housing of the drinks capsule, e.g. of the coupling body 14.

Figure 4:
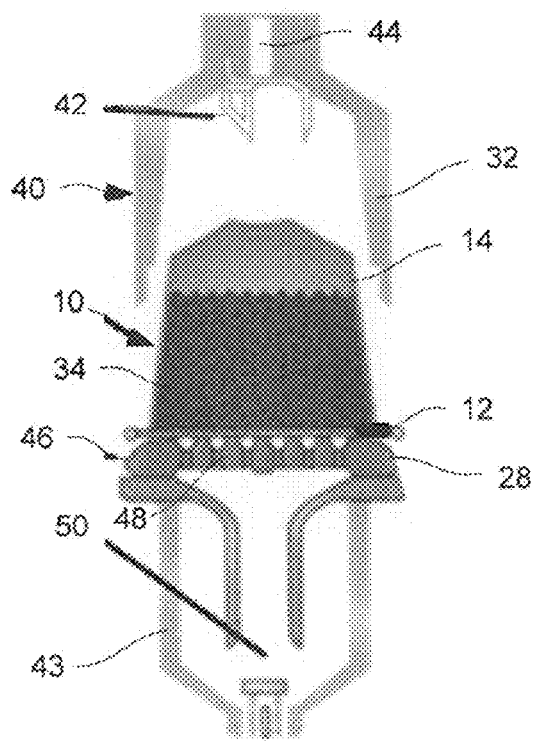
FIG. 4 shows an embodiment of a drinks capsule in a clamping apparatus of a portion hot-drinks machine.

FIG. 4 shows an embodiment of a clamping apparatus 40 of a portion hot-drinks machine which is otherwise not illustrated in FIG. 4. The clamping apparatus 40 is in the open state and a drinks capsule is arranged in the clamping apparatus 40. The portion hot-drinks machine has an RFID reader which is not illustrated in FIG. 4 and has, for example, the first electrode 28, the second electrode 32 and an electronic circuit for reading the data from the RFID apparatus 10.

The portion hot-drinks machine may be, for example, a portion coffee machine and/or a portion tea maker. The portion hot-drinks machine is suitable for preparing a hot drink, for example for preparing coffee and/or tea using pre-portioned coffee or tea portions, for example portioned into corresponding drinks capsules, for example coffee capsules or tea capsules. The drinks capsule arranged in the clamping apparatus may have the RFID apparatus 10 or may be formed therefrom, in which case the housing of the drinks capsule is formed from the coupling body 14, for example. A basic material 34 for the hot drink, for example coffee powder, coffee syrup or tea leaves, can be arranged in the drinks capsule.

The clamping apparatus 40 has an upper holding body 41 and a lower holding body 43. The upper holding body 41 may have the second electrode 32, for example. Furthermore, the upper holding body 41 may have a water inflow 42 and a water supply 44. The water supply 44 may be, for example, in the form of an inner water pipe extending through the upper holding body 41. The water inflow 42 may have, for example, thorn-like first tips which can drill through the housing of the drinks capsule when closing the clamping apparatus 40, with the result that the water can be directly supplied into the drinks capsule and the hot drink can be directly brewed in the drinks capsule.

The lower holding body 43 may have a capsule clamp 46, for example. The capsule clamp 46 may have the first reading electrode 28, for example. Furthermore, the capsule clamp 46 may have thorn-like second tips 48 which can drill through the housing of the drinks capsule when closing the clamping apparatus 40 on a side of the drinks capsule facing away from the first tips 42, with the result that the hot drink brewed in the drinks capsule can flow out of the drinks capsule through the holes produced on account of the second tips 48. The hot drink can then flow on through the lower holding body 43 and through a drink outflow 50 in the lower holding body 43, for example.

Figure 5:
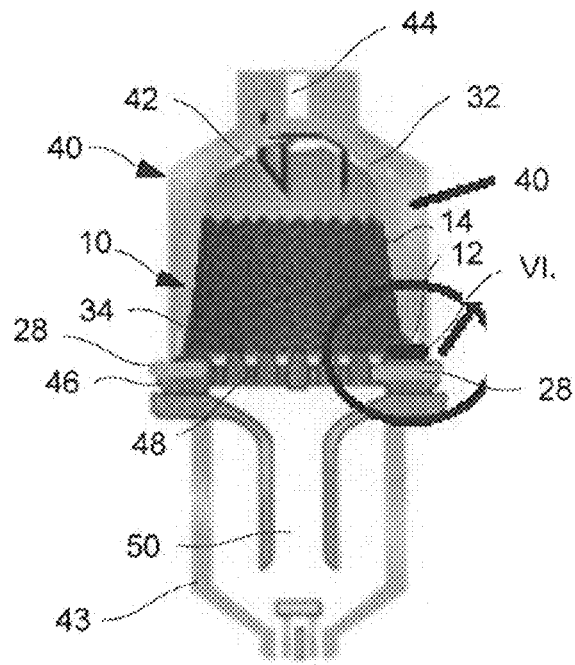
FIG. 5 shows a sectional illustration of the drinks capsule in the clamping apparatus of the portion hot-drinks machine according to FIG. 4.

FIG. 5 shows the clamping apparatus 40 according to FIG. 4 in the closed state. In various embodiments, the first tips and therefore substantially the water inflow 42 are arranged in the drinks capsule. FIG. 5 also illustrates the first reading electrode 28 and the second reading electrode 32 of the RFID reader of the portion hot-drinks machine. The second reading electrode 32 may be designed and arranged, for example, in such a manner that it is in direct physical contact with the housing of the drinks capsule over a large area, in which case the metal structure of the drinks capsule is used for capacitive coupling. The clamping apparatus 40 can therefore be used, for example, as a reading point for reading the data, for example the information relating to the hot drink contained in the drinks capsule. The information may relate, for example, to a brewing time, a water temperature, a water quantity, a brand and/or type of hot drink and/or a best-before date of the hot drink. For example, the portion hot-drinks machine may automatically prepare the hot drink on the basis of the information and/or the information may be entirely or partially displayed on a display apparatus, for example a display, of the portion hot-drinks machine. Hot water can now be poured into the housing of the drinks capsule via the water inflow 42.

Figure 6:
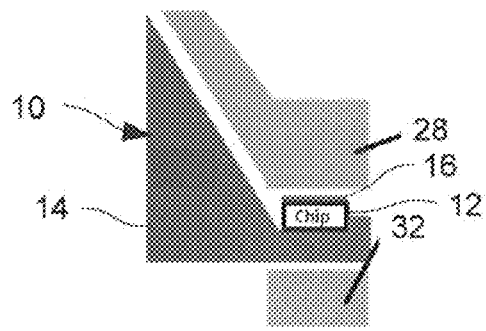
FIG. 6 shows an embodiment of an RFID apparatus.

FIG. 6 shows a detailed view of an embodiment of an RFID apparatus 10, for example the RFID apparatus 10 explained above, which may be in the form of a drinks capsule, for example. A detailed view according to FIG. 5 may be illustrated in FIG. 6, for example. In this case, the first reading electrode 28 is arranged close to the first electrode 16 of the transponder chip 12 and the second reading electrode 32 is arranged close to the coupling body 14, that is to say the housing of the drinks capsule. Otherwise, the drinks capsule, the RFID apparatus 10 and/or the RFID reader may correspond to the drinks capsule explained above, the RFID apparatus 10 explained above and the RFID reader explained above, for example.

Figure 7:
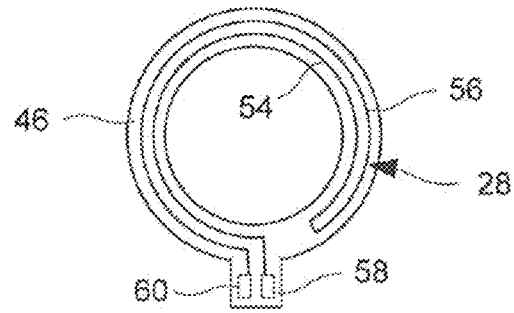
FIG. 7 shows an embodiment of an electrode of an RFID reader.

FIG. 7 shows an embodiment of an antenna of an RFID reader, for example the RFID reader explained above. This embodiment of an antenna enables inductive coupling to small RFID tags with on-chip coils (small antenna on the chip).

For example, the first reading electrode 28 may be formed from the antenna. The antenna may have an electrically conductive first line 54 and an electrically conductive second line 56, for example. The first and second lines 54, 56 may be arranged parallel to one another, for example at least in sections, for example over a large part of their longitudinal extent.

The two lines 54, 56 may be coupled, at one of their ends, to an electronic circuit of the RFID reader. The electronic circuit of the RFID reader may have, for example, a first antenna connection 58 which may be electrically coupled to the first line 54, for example, and a second antenna connection 60 which may be electrically coupled to the second line 56, for example.

Starting from the two antenna connections 58, 60, the two lines 54, 56 may extend parallel to one another as far as one end of the lines 54, 56 which is at a distance from the antenna connections 58, 60. The two lines 54, 56 may be electrically coupled to one another at the corresponding end. For example, the two lines 54, 56 may be integrally formed, for example from a metal wire or a continuous metal conductor element, in which case a turning point and/or bending point of the corresponding integral structure is formed at that end of the line 54, 56 which is remote from the antenna connections 58, 60. The two parallel lines 54, 56 may also form a plurality of turns in the manner of an elongate coil, for example.

The reading antenna may be circular, for example. The circular form can be selected, for example, in such a manner that a drinks capsule, for example the drinks capsule explained above, can be inserted into a central recess of the antenna and the protruding edge of the drinks capsule can rest on the antenna. The size and shape of the Lecher line, for example the lines 54, 56, can therefore be designed exactly for the drinks capsule in order to ensure communication with the transponder chip 12. As a result, the transponder chip 12 can be easily arranged close to the first electrode 28 formed from the antenna and can be read in a simple, precise and reliable manner. The data can be read irrespective of where exactly along the first electrode 28 the transponder chip 12 is arranged. Reading can therefore be effected irrespective of a rotational position of the drinks capsule.

FIG. 8 shows an embodiment of an antenna of an RFID reader. The antenna and/or the RFID reader may largely correspond, for example, to the antenna explained above and/or the RFID reader explained above. The antenna can be used instead of the first reading electrode 28, for example. A second reading electrode opposite the first reading electrode 28 is no longer required in the case of inductive coupling as a result of the use of the antennas described. The antenna has, for example, the two lines 54, 56 which extend parallel to one another, for example, in a linear direction and are connected at the end. The lines 54 and 56 may also form an elongate coil having a plurality of turns, for example.

When arranging a transponder chip 12, for example the transponder chip 12 explained above, the data on the transponder chip 12 can be read in a precise and/or reliable manner irrespective of the location along the longitudinal linear extent of the two lines 54, 56 at which the transponder chip 12 is arranged. In addition, the antenna can be moved relative to the RFID apparatus 10, for example in order to read data on a transponder chip 12 which is arranged at an unknown location in a flat area. For example, the antenna can be moved and/or the RFID apparatus 10 can be moved. If the RFID apparatus 10 having the transponder chip 12 is a sub-element of a banknote, for example, the latter can be moved from the top down in FIG. 8 beyond the first electrode or antenna 28, for example.

FIG. 9 shows an embodiment of an area detector of an RFID reader which may largely correspond to the RFID reader explained above, for example. The area detector 62 has a plurality of parallel first and second lines 54, 56. In this case, pairs of the lines 54, 56 are partially arranged parallel to one another and other pairs of the lines 54, 56 intersect. For example, the pairs of lines 54, 56 intersect with an angle of 90°. A matrix, for example, can be produced as a result. A position of the transponder chip 12 and therefore of the RFID apparatus 10 relative to the area detector 62 can be determined by selectively reading the pairs of lines 54, 56.

FIG. 10 shows a perspective view of the area detector 62 according to FIG. 9. The area detector 62 may have a first multiplexer 64 and a second multiplexer 66. The two multiplexers 64, 66 may be electrically coupled, for example, to the electronic circuit of the RFID reader, for example a reading circuit 68 of the RFID reader. The reading circuit 68 and the multiplexers 64, 66 make it possible to selectively control and/or read or scan the parallel lines 54, 56 of the area detector 12 and therefore to determine the position of the transponder chip 12 on the area detector 62. Alternatively, two reading circuits 62 without multiplexers 66, 68 may also be arranged, for example.

Figure 11:
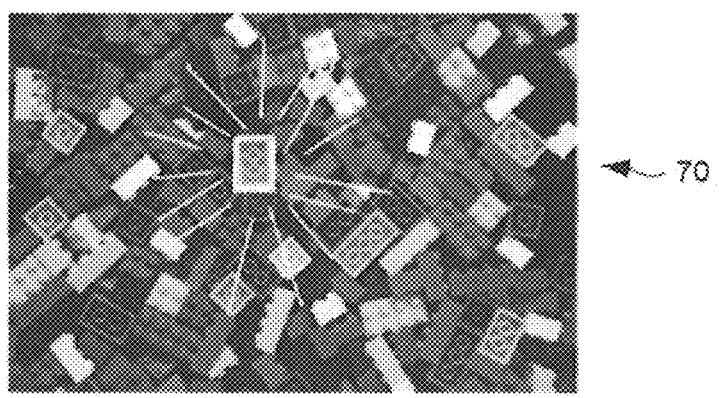
FIG. 11 shows an embodiment of a first possible use of an area detection field.

FIG. 11 shows an embodiment of a possible use of an area detector, for example the area detector 62 explained above. For example, components, for example technical components, for example chips, or kids' building blocks and/or toy bricks, may each be provided with a transponder chip 12 and/or an RFID apparatus 10. If such components are then arranged on the area detector 62, they can be quickly and easily identified and/or found. Furthermore, a signal, for example an optical signal, can then be generated at the location of one of the corresponding components, with the result that a user of the components can quickly find the component being searched for. For example, the area detector 62 may be coupled to a computing unit which can be operated by the user, for example to a computer, and the user can input a search query to search for a particular component which is then searched for with the aid of the area detector 62. After the corresponding component has been found, its position can be indicated on the area detector 62, for example with the aid of luminous elements (not illustrated), for example by means of LEDs which may be integrated in the area detector 62, for example.

Figure 12:
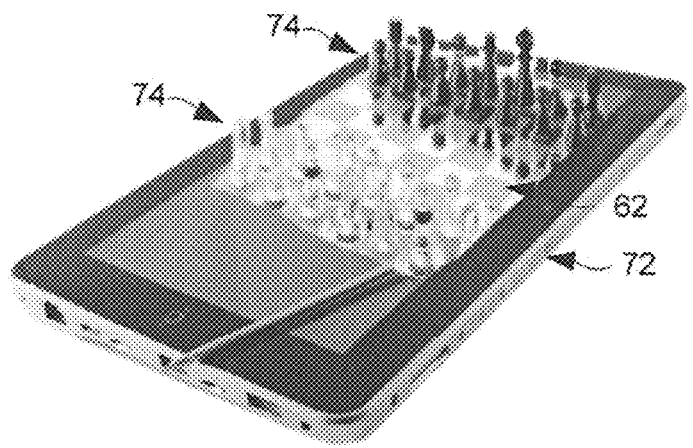
FIG. 12 shows an embodiment of a second possible use of an area detection field.

FIG. 12 shows an embodiment of another possible use of an area detector, for example the area detector 62 explained above. A smartphone 72, a laptop or a tablet PC, for example, may have the area detector 62 on or in its display surface. One, two or more RFID apparatuses 10 on the area detector 62 can then be detected with the aid of the area detector 62 and the position thereof can be determined. For example, first game pieces 74 and/or second game pieces 76, for example black and white chess pieces, and their position on the area detector 62 can be detected if each of the game pieces to be detected has a corresponding RFID apparatus 10. The data which are then stored on the transponder chip 12 may include, for example, a color of the game piece and/or a type of game piece, in which case the type of game piece may be based, for example, on whether the game piece is a pawn, a bishop, a knight, a rook, a king or a queen. In addition, a corresponding playing field, for example a chessboard, can be displayed using the display.

Alternatively, the area detector 62 can be used to implement a security function. For example, the selection of a field displayed on the display by means of an RFID apparatus 10 and/or by means of a transponder chip 12 can be implemented as an access code, as a result of which a user or owner of the device can be identified. In this case, the transponder chip 12 can be used as a key and/or the area detector 62 can be used as a lock, for example. Such a transponder chip 12 (key) can be arranged, for example, in a key ring or a ring, for example a wedding ring.

The invention is not restricted to the embodiments stated. For example, the stated embodiments can be combined with one another. For example, the portion hot-drinks machine may have the area detector 62. Furthermore, the area detector 62 can also be used outside a smartphone or tablet PC (personal computer) 72. Furthermore, the area detector 62 can be used for games other than chess, for example for checkers. Furthermore, components other than the components shown may also be equipped with RFID apparatuses 10 and/or transponder chips 12, for example wooden blocks, and these can then be detected on an area detector 62. Furthermore, the RFID apparatus 10 shown in FIG. 1 may have more or fewer electrical components, for example resistors, capacitors, coils and/or storage elements.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A system, comprising:
a Radio Frequency Identification apparatus, comprising:
   a coupling body having a metal material;
   a transponder chip configured to contactlessly transmit data, wherein the transponder chip is disposed on an exterior portion of a component comprising the coupling body, has a storage element which stores the data, and has a first electrode which is at a distance from the coupling body; wherein the component is selected from the group consisting of a drinks capsule, a coin, a piece of money, and an item of jewelry;
   wherein the coupling body is in the form of a second electrode for the transponder chip configured to couple the transponder chip to an external Radio Frequency Identification reader for reading the data;
a Radio Frequency Identification reader, comprising:
   an electronic circuit for reading the data; and
   an antenna having an electrically conductive first line and an electrically conductive second line which run in a parallel manner at least in sections and are each electrically coupled, at a first end of their ends, to the electronic circuit and are electrically coupled to one another at their second end.

2. A system, comprising:
a Radio Frequency Identification apparatus, comprising:
   a coupling body having a metal material;
   a transponder chip configured to contactlessly transmit data, wherein the transponder chip is physically coupled to an exterior portion of a component comprising the coupling body, has a storage element which stores the data, and has a first electrode which is at a distance from the coupling body; wherein the component is selected from the group consisting of a drinks capsule, a coin, and a piece of money;
   wherein the coupling body is in the form of a second electrode for the transponder chip configured to couple the transponder chip to an external Radio Frequency Identification reader for reading the data;
a portion hot-drinks machine for receiving a drinks capsule, the portion hot-drinks machine comprising:
   a Radio Frequency Identification reader which is designed and arranged in such a manner that, when the component having a transponder chip with data stored thereon is arranged in the portion hot-drinks machine in the intended manner, the data on the transponder chip can be read with the aid of the Radio Frequency Identification reader.

3. A Radio Frequency Identification apparatus, comprising:
a transponder chip configured to contactlessly transmit data, wherein the transponder chip is disposed on an exterior portion of a component, has a storage element which stores the data, and has a first electrode;
wherein the component is selected from the group consisting of a drinks capsule, a coin, a piece of money, and an item of jewelry; wherein the component comprises a metal coupling body configured as a second electrode for the transponder chip and further configured to couple the transponder chip to an external Radio Frequency Identification reader for reading the data.

4. The Radio Frequency Identification apparatus of claim 3,
wherein the coupling body is in the form of a second electrode for the transponder chip configured to couple the transponder chip in a capacitive manner to an external Radio Frequency Identification reader for reading the data.

5. The Radio Frequency Identification apparatus of claim 3,
wherein the first electrode is formed on a first side of the transponder chip; and
wherein the coupling body is arranged on a second side of the transponder chip facing away from the first side.

6. The Radio Frequency Identification apparatus of claim 5,
wherein the first electrode is flat and extends over the first side of the transponder chip.

7. The Radio Frequency Identification apparatus of claim 3,
wherein the transponder chip has a wide-range rectifier.

8. The Radio Frequency Identification apparatus of claim 7,
wherein the wide-range rectifier is arranged between the first electrode and the coupling body.

9. The Radio Frequency Identification apparatus of claim 3, wherein the coupling body is formed from metal.

10. The Radio Frequency Identification apparatus of claim 3, wherein the first electrode has aluminum or copper.

11. The Radio Frequency Identification apparatus of claim 3, wherein the transponder chip is fastened to the coupling body by means of a bonding agent.

* * * * *